United States Patent
Yun et al.

(10) Patent No.: US 11,302,950 B2
(45) Date of Patent: Apr. 12, 2022

(54) METHOD FOR MANUFACTURING ELECTROLYTE MEMBRANE FOR FUEL CELLS AND ELECTROLYTE MEMBRANE MANUFACTURED BY THE SAME

(71) Applicants: Hyundai Motor Company, Seoul (KR); Kia Motors Corporation, Seoul (KR)

(72) Inventors: Sukhwan Yun, Gyeonggi-do (KR); Bo Ki Hong, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 299 days.

(21) Appl. No.: 16/194,963

(22) Filed: Nov. 19, 2018

(65) Prior Publication Data
US 2019/0334189 A1    Oct. 31, 2019

(30) Foreign Application Priority Data
Apr. 26, 2018    (KR) .................. 10-2018-0048312

(51) Int. Cl.
| | |
|---|---|
| *H01M 8/1086* | (2016.01) |
| *H01M 8/1039* | (2016.01) |
| *H01M 8/1023* | (2016.01) |
| *H01M 8/1018* | (2016.01) |
| *H01M 8/1053* | (2016.01) |
| *H01M 8/106* | (2016.01) |
| *H01M 8/10* | (2016.01) |

(52) U.S. Cl.
CPC ......... *H01M 8/1086* (2013.01); *H01M 8/106* (2013.01); *H01M 8/109* (2013.01); *H01M 8/1023* (2013.01); *H01M 8/1039* (2013.01); *H01M 8/1053* (2013.01); *H01M 2008/1095* (2013.01)

(58) Field of Classification Search
CPC ............................................ H01M 8/10–1097
See application file for complete search history.

(56) References Cited

U.S. PATENT DOCUMENTS

| | | | | |
|---|---|---|---|---|
| 5,164,060 A | * | 11/1992 | Eisman ................. | C08J 5/2293 204/282 |
| 5,752,988 A | * | 5/1998 | Okamoto ............ | H01M 4/8882 29/623.5 |
| 6,156,184 A | * | 12/2000 | Antonucci .......... | H01M 8/0289 205/334 |
| 2003/0003340 A1 | * | 1/2003 | Honma ............... | H01M 8/1044 429/492 |

(Continued)

FOREIGN PATENT DOCUMENTS

| | | |
|---|---|---|
| JP | H09199144 A | 7/1997 |
| JP | 2008270045 A | 11/2008 |

(Continued)

*Primary Examiner* — Jonathan Crepeau
*Assistant Examiner* — Jacob Buchanan
(74) *Attorney, Agent, or Firm* — Mintz Levin Cohn Ferris Glovsky and Popeo, P.C.; Peter F. Corless

(57) ABSTRACT

Disclosed is a method of manufacturing an electrolyte membrane for fuel cells. The method includes preparing an electrolyte layer including one or more ion conductive polymers that form a proton movement channel, and permeating a gas from a first surface of the electrolyte layer to a second surface of the electrolyte layer.

15 Claims, 5 Drawing Sheets

(56) References Cited

U.S. PATENT DOCUMENTS

| | | | |
|---|---|---|---|
| 2004/0062970 A1* | 4/2004 | Nomura | C08G 77/50 |
| | | | 528/30 |
| 2006/0105214 A1* | 5/2006 | Anderson | H01M 8/1004 |
| | | | 29/623.2 |
| 2007/0087245 A1* | 4/2007 | Fuller | H01M 4/926 |
| | | | 429/454 |
| 2009/0068528 A1 | 3/2009 | Teasley | |
| 2010/0129730 A1* | 5/2010 | Suzuki | H01M 8/1004 |
| | | | 429/483 |
| 2013/0052564 A1 | 2/2013 | Sakai et al. | |

FOREIGN PATENT DOCUMENTS

| | | |
|---|---|---|
| JP | 2010219028 A | 9/2010 |
| KR | 101138670 B1 | 4/2012 |
| KR | 101191052 B1 | 10/2012 |
| KR | 20140076475 A | 6/2014 |
| KR | 20150001125 U | 3/2015 |
| KR | 101509734 B1 | 4/2015 |
| KR | 101648428 B1 | 9/2016 |

\* cited by examiner

⊖ Functional group
⊕ Proton
◉ Water molecule
∼ Ion conductive polymer

METHOD FOR MANUFACTURING ELECTROLYTE MEMBRANE FOR FUEL CELLS AND ELECTROLYTE MEMBRANE MANUFACTURED BY THE SAME

CROSS-REFERENCE TO RELATED APPLICATION

This application claims, under 35 U.S.C. § 119(a), the benefit of priority to Korean Patent Application No. 10-2018-0048312 filed on Apr. 26, 2018, the entire contents of which are incorporated herein by reference.

TECHNICAL FIELD

The present invention relates to a method of manufacturing an electrolyte membrane for fuel cells and an electrolyte membrane manufactured by the method. The electrolyte membrane may have a realigned ion movement channel.

BACKGROUND

Generally, polymer electrolyte membrane fuel cells (PEMFCs) have been used in a vehicle. for the polymer electrolyte membrane fuel cells should stably operate within a wide current density range to normally exert a high power of at least several tens of kW or greater.

The reaction for electricity production by fuel cells occurs in a membrane-electrode assembly (MEA) which includes an ionomer-based membrane and a pair of electrodes (an anode and a cathode). Hydrogen supplied to an anode, which is an oxidation electrode for fuel cells, is split into a proton and an electron, and then the proton and the electron are moved through an electrolyte membrane and an exterior circuit, respectively, to a reduction electrode (cathode). Then, at the cathode, an oxygen molecule, the proton and the electron react together, to produce electricity and heat, and at the same time, water ($H_2O$) as a by-product. The water produced during electrochemical reaction in the fuel cell advantageously functions to maintain humidity of the membrane-electrode assembly, when present in an appropriate amount. However, unless produced excess water is suitably removed, flooding occurs at a high current density. The flooded water interferes with efficient supply of reaction gases into the fuel cell, thus causing serious voltage loss. In the electrochemical reaction of fuel cells, when protons at the anode are moved through the membrane to the cathode, they are combined in the form of hydronium ions such as $H_3O^+$ with water molecules and drag the water molecules. This phenomenon is referred to as "electro-osmotic drag (EOD)". In addition, as the amount of water accumulated in the cathode increases, a part of water is reversely moved from the cathode to the anode. This is referred to as "back diffusion" (BD). Accordingly, in order to obtain excellent cell performance in the fuel cell, the movement of water, protons or the like should be efficient.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, the present invention provides an electrolyte membrane having a realigned ion movement channel. For example, movement of ions through realignment of an ion movement channel in the electrolyte membrane may be facilitated.

In one aspect, provided is a method of manufacturing an electrolyte membrane for fuel cells. The method may include steps of: preparing an electrolyte layer including one or more ion conductive polymers that form a proton movement channel, and permeating a gas from a first surface of the electrolyte layer to a second surface. Preferably, a tortuosity of the proton movement channel may be reduced by the permeating the gas.

The term "ion conductive polymer" as used herein refers to a polymeric compound or resin that can transfer ions (e.g., cations or anions) by functional groups, for example, containing ionic characteristics. Preferred ion conductive polymer may include at least one or more functional groups of positively charged (cationic) or negatively charged (anionic) on the pendant groups of the polymer structure. In certain embodiments, exemplary ion conductive polymer contains anionic groups that can release or donate electrons such that the ion conductive polymer may hold or accommodate positively charged ions such as protons.

The term "proton movement channel" as used herein refers to an internal space where protons may be accommodated, captured or ionically bonded, or flow. Preferred proton movement channel may be formed or surrounded by anionic groups, e.g., sulfonic acid or carboxylic acid groups, which are arranged to form inner structure (e.g., a channel, cavity or labyrinth).

The one or more ion conductive polymers may be the same or different.

Preferably, each of the one or more ion conductive polymers may include a main chain including polytetrafluoroethylene (PTFE) and a side-chain including a sulfonic acid group ($—SO_3H$).

The electrolyte layer may suitably have a thickness of about 5 to 100 μm. The electrolyte layer may suitably include a first layer including the one or more ion conductive polymers, and a second layer including the one or more ion conductive polymers and a support having a three-dimensional network structure. The first layer and the second layer may be disposed adjacent to each other such that ions are movable between the first layer and the second layer.

The support may suitably include one or more selected from expanded polytetrafluoroethylene (e-PTFE) and porous ultra-high molecular weight polyethylene (UHMWPE) having an atomic weight of about 3.5 to 7.5 Mamu (million atomic mass unit).

The term "expanded polytetrafluoroethylene" or "e-PTFE" is meant by a polytetrafluoroethylene polymer product that may contain microporous fibrous structures. Typical e-PTFE may be stretchable or flexible and may allow passage of fluids (e.g., gas or liquid) through the porous structure.

The term "ultra-high-molecular-weight polyethylene" or "UHMWPE" is meant by a polyethylene typically having a molecular mass usually between 3.5 and 7.5 million Da.

The gas may include one or more selected from the group consisting of water vapor ($H_2O$), ethanol ($C_2H_5OH$), and propanol ($C_3H_7OH$).

In the reducing tortuosity of the proton movement channel, the gas may be permeated by heating to a temperature ranging from a first heating temperature 2° C. higher than a α-transition temperature (Tα) of the one or more ion conductive polymers to 200° C.

The gas may have a boiling point less than the first heating temperature.

The gas may permeate the electrolyte layer at a saturated vapor pressure of the gas.

Preferably, the saturated vapor pressure of the gas may be about 0.01 to 1 MPa. The gas may suitably permeate in an amount of about 0.1 to 10 [mg/cm$^2$·min] per unit time and unit area.

The gas may suitably permeate from the first surface to the second surface by making a concentration of the gas at the first surface greater than that at the second surface in the electrolyte layer. A difference in concentration for permeating the gas may preferably be at least about 5%, 10%, 20%, 30%, 40%, 50%, 60%, 70%, 80%, 90% or greater relative to the concentration at the first surface.

The gas may suitably permeate from the first surface to the second surface by making a pressure at the first surface greater than that at the second surface in the electrolyte layer. A difference in pressure for permeating the gas may preferably be at least about 5%, 10%, 20%, 30%, 40%, 50%, 60%, 70%, 80%, 90% or greater relative to the pressure at the first surface.

The gas may be heated.

In another aspect, provided is an electrolyte membrane manufactured by the method as described herein.

Further provided is a fuel cell including the electrolyte membrane as described herein.

Still provided is a vehicle including the fuel cell as described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
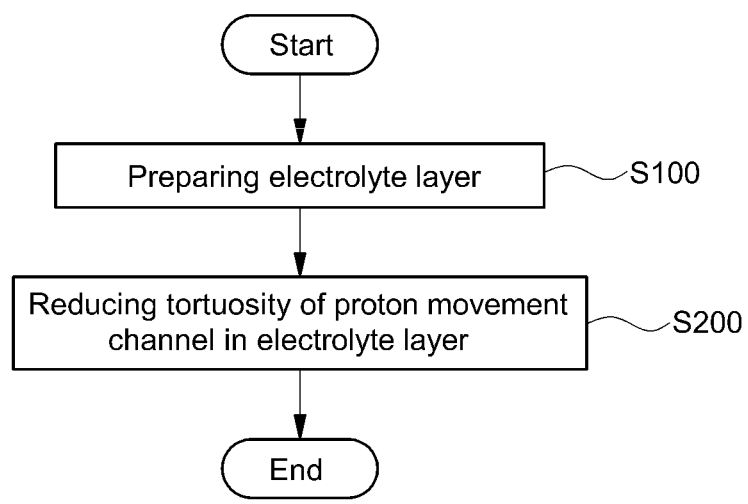
FIG. 1 shows an exemplary method of manufacturing an exemplary electrolyte membrane according to an exemplary embodiment of the present invention.

Hereinafter, preferred embodiments of the present invention will be described in detail with reference to the annexed drawings. Advantages and features of the present invention and methods for accomplishing the same will be clearly understood from the following preferred embodiments with reference to the annexed drawings. However, the present invention is not limited to the embodiments and will be embodied in different forms. The embodiments are suggested only to offer thorough and complete understanding of the disclosed contents and to sufficiently inform those skilled in the art of the technical concept of the present invention. The scope of the present invention is defined only by claims. Like reference numbers refer to like elements throughout the description of the figures.

Unless differently defined, all terms used herein (including technical or scientific terms) have the same meanings as generally understood by those skilled in the art to which the present invention pertains. In addition, terms identical to those defined in generally used dictionaries should be interpreted as having meanings identical to contextual meanings of the related art, and are not interpreted as having ideal or excessively formal meanings unless they are definitely defined in the present specification.

In addition, terms herein used are provided only for illustration of embodiments and should not be construed as limiting the scope of the present invention. Singular forms are intended to include plural forms as well, unless context clearly indicates otherwise. It will be further understood that the terms "comprises", "includes" and the like, when used in this specification, specify the presence of stated elements, features, numbers, steps and/or operations, but do not preclude the presence or addition of one or more other elements, features, numbers, steps and/or operations. In addition, "and/or" includes each of the mentioned items and a combination of one or more thereof.

In addition, it will be understood that when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all the numbers, figures and/or expressions. In addition, when numerical ranges are disclosed in the description, these ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13% as well as 30%, and any sub-ranges of 10% to 15%, 12% to 18%, or 20% to 30%, as well as any figures, such as 10.5%, 15.5% and 25.5%, between appropriate integers that fall within the range.

Hereinafter, the present invention will be described in more detail with reference to the annexed drawings.

FIG. 1 is a flowchart illustrating an exemplary method of manufacturing an exemplary electrolyte membrane according to an exemplary embodiment of the present invention.

As shown in FIG. 1, the method of manufacturing an electrolyte membrane for fuel cells may include preparing an electrolyte layer including one or more ion conductive polymers ("ionomer") and reducing tortuosity (or distortion) of the proton movement channel by permeating a gas into the electrolyte layer (S200). Preferably, the one ore more ion conductive polymers may form a proton movement channel (S100). For example, the proton movement channel included in the electrolyte layer may be an area where the ion conductive polymer three-dimensionally may contact another ion conductive polymer and may be means for a channel allowing protons to be moved. For example, protons may be moved from an electrolyte membrane for a fuel cell to an electrode for the fuel cell via the proton movement channel.

Tortuosity may be a direct parameter to describe a movement channel of ions. The term "tortuosity" used herein refers to a winding degree of a channel of protons in the ion conductive polymer. Accordingly, in order to facilitate movement of protons for improvement in efficiency of the fuel cell, linear proton movement channels may be preferably incorporated. Meanwhile, by measuring and comparing the porosity and effective diffusion coefficient of the electrolyte layer, the difference in tortuosity between ion movement channels may be relatively determined.

The ion conductive polymer included in the electrolyte layer according to an exemplary embodiment of the present invention may be produced by co-polymerizing a main-chain (or backbone) and a side-chain (or functional-chain) including a precursor monomer. The side-chain of the ion conductive polymer may suitably include a short side-chain, a medium side-chain and a long side-chain depending on the molecular weight thereof.

For example, the ion conductive polymer of the electrolyte layer according to an exemplary embodiment of the present invention may include polytetrafluoroethylene (PTFE) in a main chain thereof. In addition, such an ion conductive polymer may include a sulfonic acid group (—$SO_3H$) in a side-chain thereof. In addition, the functional group disposed at an end of the side-chain of the ion conductive polymer may include sulfonyl fluoride (—$SO_2F$). Sulfonyl fluoride may not commonly conduct protons due to low hydrophilicity and thus may have poor water uptake. Meanwhile, hydrolysis using an alkaline aqueous solution may be conducted in order to replace the sulfonyl fluoride functional group by the sulfonic acid group (—$SO_3H$).

In particular, the ion conductive polymer according to exemplary embodiments of the present invention may preferably include a perfluorinated ionomer. Such a perfluorinated ion conductive polymer may have a structure in which a main chain including polytetrafluoroethylene (PTFE) is linked to a side-chain including a sulfonic acid group. In addition, hexafluoropropylene epoxide (HFPO) may be used with tetrafluoroethylene, as raw materials for synthesizing a perfluorinated ionomer.

Meanwhile, in the preparing an electrolyte layer according to an exemplary embodiment of the present invention (S100), the electrolyte layer may include a first layer and a second layer. The first layer may include only the one or more ion conductive polymers. On the other hand, the second layer may include the one or more ion conductive polymers and a support. The support may reinforce the ion conductive polymer of the combination layer. The support may, for example, have a three-dimensional network structure.

In addition, the first layer and the second layer may be disposed adjacent to each other. Accordingly, ions (for example, protons) may be moved between the pure layer and the combination layer.

As described above, as a result of incorporation of the support into the ion conductive polymer, mechanical strength, or mechanical durability or chemical durability of the electrolyte membrane can be secured. Particularly, in order to improve functions of the fuel cell, an electrolyte membrane having a thin thickness (for example, about 30 μm or less) may be incorporated. As a result, in order to secure mechanical strength and mechanical/chemical durability of the thin electrolyte membrane, the support may be included.

For example, a support having a three-dimensional network structure may include one or more selected from expanded-polytetrafluoroethylene (e-PTFE) and porous ultra-high molecular weight polyethylene (UHMWPE). The porous ultra-high molecular weight polyethylene (UHMWPE) may have an atomic weight of about 3.5 to 7.5 Mamu (million atomic mass unit).

In particular, expanded-polytetrafluoroethylene may have excellent mechanical properties (for example, tensile strength or elongation) and may reduce hydrogen crossover through the electrolyte membrane. Accordingly, the fuel usage efficiency of the fuel cell may be improved. Examples of the support that may be included in the electrolyte layer include expanded polytetrafluoroethylene or ultrahigh molecular weight polyethylene, but the present invention is not limited thereto. For example, a fluorinated polymer such as polyvinylidene fluoride (PVDF) with a web structure produced by an electrospinning method may be included as a support in the electrolyte layer support.

Hereinafter, the method of manufacturing an electrolyte membrane for fuel cells according to exemplary embodiments of the present invention will be described in more detail with reference to FIGS. 2 to 6.

Figure 2:
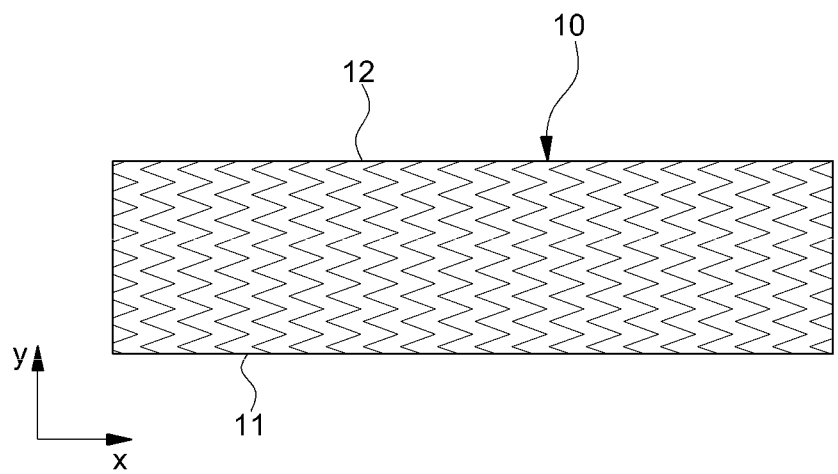
FIG. 2 is a sectional view illustrating an exemplary electrolyte layer in S100 of FIG. 1.
Figure 3:
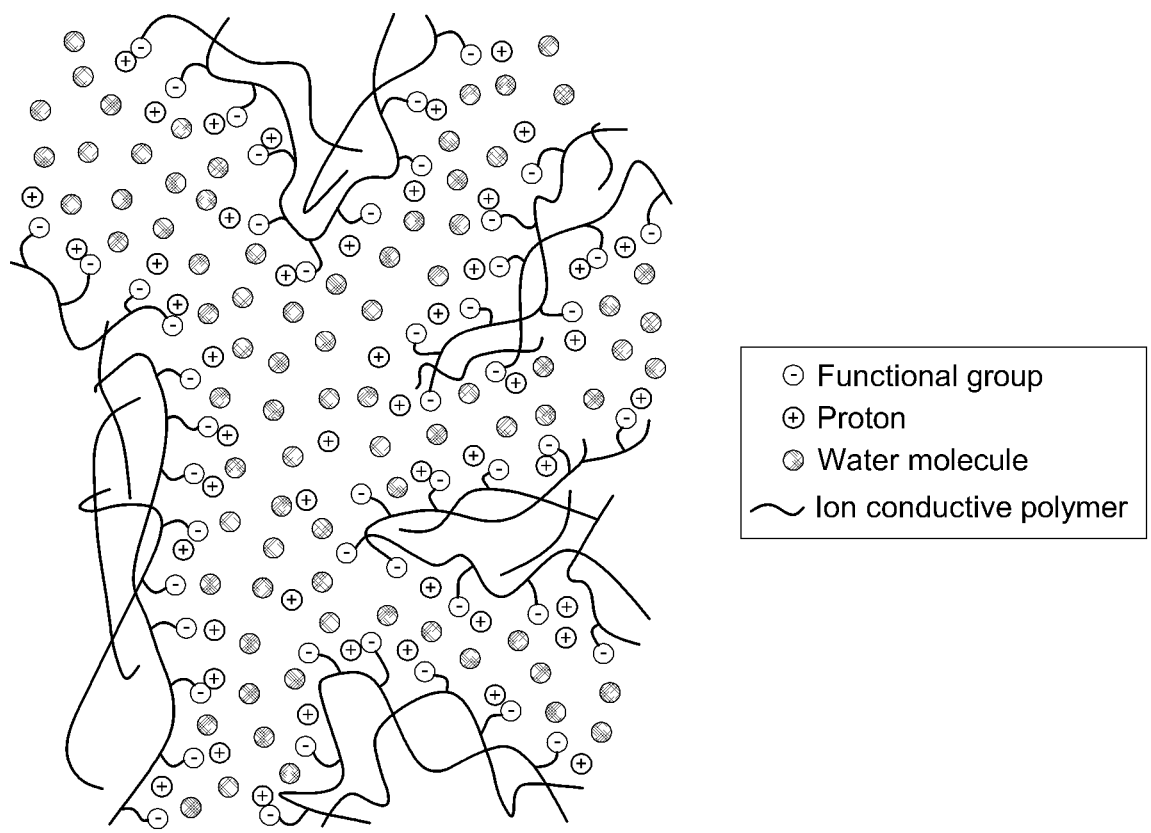
FIG. 3 is an enlarged view of the cross-section of the electrolyte layer shown in FIG. 2.

FIGS. 2 and 3 are a sectional view illustrating the electrolyte layer in S100 of FIG. 1 and an enlarged view of the cross-section thereof, respectively. For convenience of illustration, the following description will focus on different aspects from those illustrated with reference to FIG. 1.

As shown in FIG. 2, an electrolyte layer 10 including ion conductive polymers and proton movement channels may have a first surface 11 and a second surface 12 facing the first surface 11.

In addition, the pattern shown in an X direction and a Y direction on the cross-section between the first surface 11 and the second surface 12 of the electrolyte layer 10 in FIG. 2 schematically shows tortuosity of the ion conductive polymer and the proton movement channel in the electrolyte layer 10. That is, FIG. 2 illustrates an example of a tortuous path along which protons move in the ion conductive polymer. For example, when protons move along a linear path (y direction) from one surface 11 to another surface 12 of the electrolyte layer 10, tortuosity is theoretically 1. Accordingly, in order to improve the efficiency of fuel cells, paths enabling protons to move faster may be needed. For this purpose, less tortuous (that is, tortuosity reaches about 1) proton movement channels are preferably introduced. Reference FIG. 2 schematically illustrates tortuosity. For example, because commonly, it is not easy to measure such a tortuosity due to complicated shape and structure of the electrolyte layer 10 (for example, ion conductive polymers with irregular shapes or different sizes). The tortuosity of the ion conductive polymer and the proton movement channel in the electrolyte layer 10 in the present invention is not limited thereto. Nevertheless, tortuosity can be inferenced by porosity or diffusion efficient of media in the polymer, or by method of X-ray or NMR imaging analysis. References to tortuosity used herein are made to an observed value determined by that protocol.

As shown in FIG. 3, the ion conductive polymer of the electrolyte layer (see 10 of FIG. 2), a functional group bonded to the ion conductive polymer, protons and water molecules will be shown illustratively.

For example, regarding the electrolyte layer 10 according to exemplary embodiments of the present invention, ion conductive polymers may contact one another three-dimensionally to form proton movement channels. For example, as shown in FIG. 3, the ion movement channels may have a mutually entangled structure. For example, a hydrophilic area where the functional group (for example, sulfonic acid group) of the ion conductive polymer may be formed as a cluster serves as an ion movement channel (for example, proton movement channel).

Figure 4:
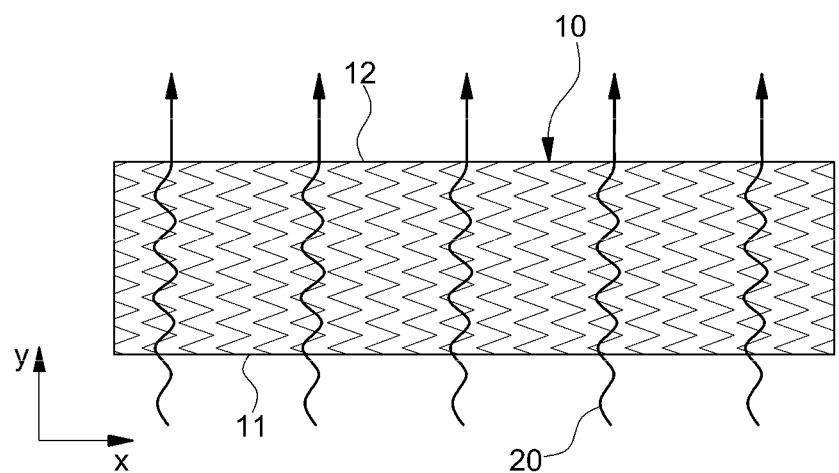
FIG. 4 is a sectional view illustrating an exemplary electrolyte layer in S200 of FIG. 1.

FIG. 4 is a sectional view illustrating the electrolyte layer in S200 of FIG. 1. For convenience of illustration, the following description will focus on different aspects from those illustrated with reference to FIGS. 1 to 3.

As shown in FIG. 4, in the reducing tortuosity (or distortion) of the proton movement channel by permeating a gas into the electrolyte layer (see S200 of FIG. 1), by permeating the gas from the first surface 11 of the electrolyte layer 10 toward a direction (for example, a thickness direction (y direction)) of the second surface 12 facing the one surface 11, the tortuosity of the proton movement channel may be reduced. Tortuosity is preferably reduced by at least about 5%, 10%, 20%, 30%, 40%, 50%, or 60% or greater relative to the initial tortuosity before the permeating the gas.

As In addition, a used gas 20 may include one or more from the group consisting of water vapor ($H_2O$), ethanol ($C_2H_5OH$), and propanol ($C_3H_7OH$). In order to prevent change in physical properties of the polymer constituting the electrolyte layer 10 due to the residue of the permeated gas 20, preferably, water vapor ($H_2O$) may be used as the gas 20.

The method of manufacturing an electrolyte membrane for fuel cells according to exemplary embodiments of the present invention may, for example, include reorientation or realignment of the ion movement channel through preferential vapor permeation in thickness or through-plane directions from the first surface 11 of the electrolyte layer 10 toward the second surface 12.

Meanwhile, regarding the method of manufacturing an electrolyte membrane according to exemplary embodiments of the present invention, the electrolyte layer 10 may suitably have a thickness of about 5 to 100 μm. Particularly, the electrolyte layer 10 may have a thickness ranging from about 10 to about 60 μm. When the electrolyte layer 10 has a thickness of less than about 5 μm, mechanical stability may be rapidly deteriorated due to excessive permeation of the gas 20 (for example, water vapor) and thus excessive swelling of the electrolyte membrane and hydrogen crossover may be increased. On the other hand, when the thickness of the electrolyte layer is greater than about 100 μm, efficiency of permeating the gas 20 may not be efficient and electrochemical reaction rate of fuel cells may be decreased due to increased resistance of the electrolyte membrane. As a result, when the thickness of the electrolyte layer 10 is greater than 100 μm, the power of fuel cells may be deteriorated.

Meanwhile, in the reducing tortuosity of the proton movement channel (S200) in the method of manufacturing an electrolyte membrane according to exemplary embodiments of the present invention, the gas 20 to be permeated may be heated at a temperature ranging from a first heating temperature, which is 2° C. greater than an α-transition temperature (Tα) of the ion conductive polymer constituting the electrolyte layer 10, to about 200° C., before permeating into the electrolyte layer 10.

When the heating temperature is 2° C. less than the α-transition temperature, the ion conductive polymer (for example, a perfluorinated sulfonic acid ionomer) constituting the electrolyte layer 10 may have a high potential of extending the ion movement channel due to low mobility when the gas 20 (for example, water vapor) is supplied from the outside. On the other hand, when the heating temperature is greater than about 200° C., the ion conductive polymer may be thermally degraded and the performance of the electrolyte layer 10 may be thus deteriorated.

Meanwhile, when heat supply is ceased, after permeating the gas 20 into the electrolyte layer 10 in a thickness direction thereof (for example, preferential permeation in the y direction) within the temperature range (from the first temperature 2° C. greater than α-transition temperature to about 200° C.), realigned ion movement channels may be fixed while retaining their structures. As such, as a result of permeating a gas (for example, water vapor) at a greater temperature than the α-transition temperature of the electrolyte layer 10 in the thickness direction (for example, the y direction) of the electrolyte layer 10, proton movement channels (tortuous proton-conducting channels) in the electrolyte layer 10 may be selectively reoriented (or arranged), thereby reducing tortuosity. As such, by reducing the ion movement distance in the modified electrolyte membrane, the ability to conduct protons may be improved. Accordingly, performance of fuel cells may be further enhanced. In addition, the structure having the directionality as described above may ultimately contribute to improvement of the mechanical strength of the electrolyte membrane.

Meanwhile, the gas 20 to be permeated may, for example, may have a boiling point of less than a temperature 2° C. greater than the α-transition temperature of the ion conductive polymer constituting the electrolyte layer 10.

In addition, the α-transition temperature of the electrolyte layer 10 may be determined depending on the kind and density of the side-chain bonded to the main chain of the ion conductive polymer constituting the electrolyte layer 10.

Regarding the method of manufacturing an electrolyte membrane according to exemplary embodiments of the present invention, in the reducing the tortuosity of the proton movement channel (S200), the gas 20 may be permeated into the electrolyte layer 10 through saturated vapor pressure of the gas 20. For example, when the gas 20 (for example, water vapor) permeates from the first surface 11 to the second surface 12 of the electrolyte layer 10, in order to permeate the gas in the thickness direction (for example, y direction) of the electrolyte layer 10, a pressure (for example, saturated vapor pressure of the gas 20) may be applied to one surface 11.

Meanwhile, the pressure applied to permeate the gas in the thickness direction of the electrolyte layer 10 may be required to reduce tortuosity of the ion movement channel formed in the electrolyte layer 10. For example, by modifying the nano- and micro-structure of ionomer present in the electrolyte layer 10, driving force that is sufficiently high to reduce the tortuosity of the ion movement channel needs to be supplied.

In exemplary embodiments of the present invention, driving force may be supplied through the gas 20 (for example, water vapor). For example, driving force may be determined by differences in concentration gradient and/or pressure of different gases 20 between the first surface 11 and the second surface 12 facing each other of the electrolyte layer 10, to which the driving force is applied.

The concentration and/or pressure of the gas 20 on the first surface 11 of the electrolyte layer 10 may be greater than that on the second surface 12, so that the gas 20 may permeate from the first surface 11 toward the second surface 12 (for example, y direction). In addition, preferably, heating the gas 20 may be a driving force to permeate the gas 20 into the electrolyte layer 10 to be increased.

For example, in an attempt to increase driving force based on increased difference in pressure, a sealed chamber including the gas 20 (for example, water vapor) may be brought in contact with the first surface 11 of the electrolyte layer 10 and the temperature of the chamber may be heated to about 100° C. or greater. In addition, when a reduced-pressure or vacuum chamber contacts the second surface 12 of the electrolyte layer 10, improved effect of providing selective movement of the gas 20 may occur.

Preferably, the saturated vapor pressure of the permeated gas 20 may be, for example, about 0.01 to 1 MPa. The reason for this is that, when the saturated vapor pressure may be less than 0.01 MPa, water vapor permeation rate may be slow and time efficiency may thus be deteriorated, and when the saturated vapor pressure is greater than about 1 MPa, the electrolyte layer 10 may be mechanically deformed.

Figure 5:
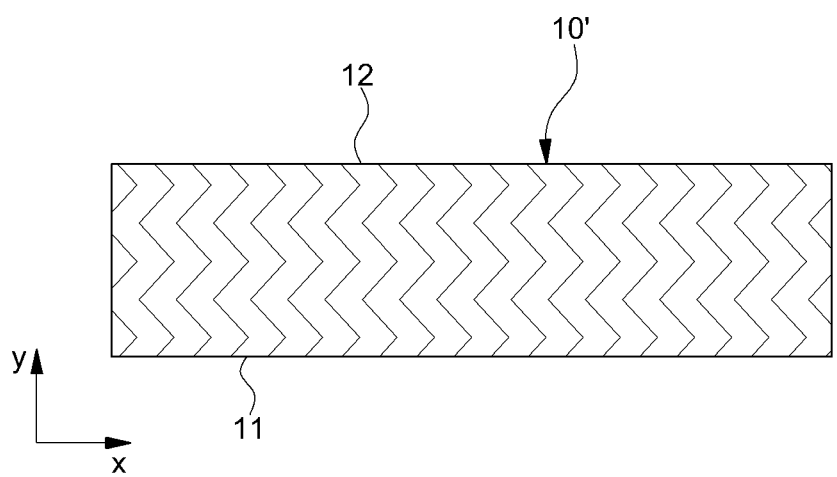
FIG. 5 is a sectional view illustrating an exemplary electrolyte membrane manufactured by an exemplary method of manufacturing an electrolyte membrane according to an exemplary embodiment of the present invention.
Figure 6:
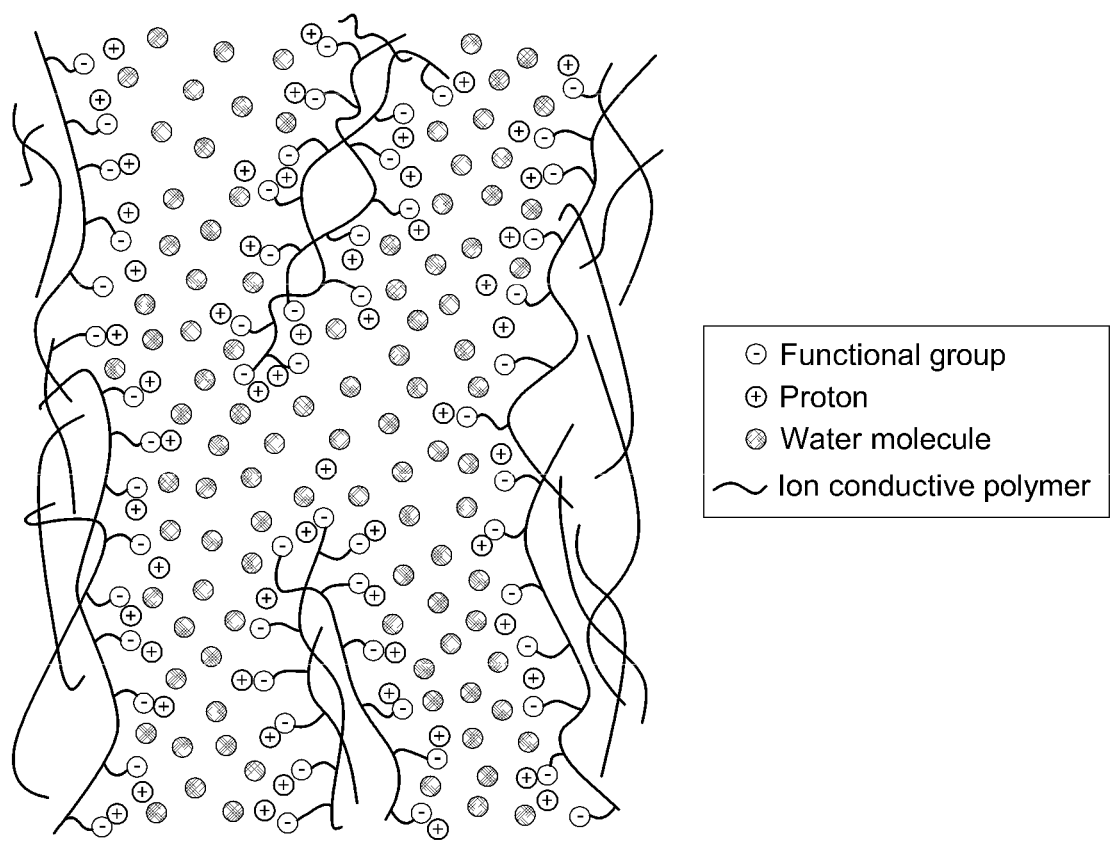
FIG. 6 is an enlarged view of the cross-section of the electrolyte layer shown in FIG. 5.

FIGS. 5 and 6 are a sectional view illustrating an electrolyte membrane manufactured by the method of manufacturing an electrolyte membrane according to exemplary embodiments of the present invention (see S100 and S200 of FIG. 1) and an enlarged view thereof, respectively. The following description will focus on different aspects from those illustrated with reference to FIGS. 1 to 4.

As shown in FIG. 5, the electrolyte membrane 10' manufactured by the method of manufacturing an electrolyte membrane according to exemplary embodiments of the present invention may be different from a conventional electrolyte membrane. For example, by permeating a gas in a thickness direction (for example, y direction), the proton movement channel in the electrolyte membrane 10' may be reoriented (or realigned). The pattern shown in an X direction and a Y direction on the cross-section between the first surface 11 and the second surface 12 of the electrolyte membrane 10' in FIG. 5 schematically shows tortuosity of the ion conductive polymer and such a pattern is less tortuous than that of FIG. 2. The tortuosity of the electrolyte membrane 10' manufactured by the method according to exemplary embodiments of the present invention may be closer to 1, as compared to the electrolyte layer (see 10 of FIG. 2) of FIG. 2 before gas permeation.

FIG. 6 shows the ion conductive polymer of the electrolyte membrane (see 10' of FIG. 5), a functional group bonded to the ion conductive polymer, protons and water molecules. As compared to the electrolyte layer of FIG. 3, tortuosity of the proton movement path in FIG. 6 may be decreased (that is, tortuosity is closer to 1). Accordingly, protons may be moved faster and the efficiency of fuel cells may thus be improved.

Proton conductivity directly may be related to ion movement channels formed by the ion conductive polymer and functional groups (for example, sulfonic acid groups) bonded to the ion conductive polymer. When the tortuosity of the ion movement channel is low and the distance between functional groups is short (that is, the density of functional groups per unit volume is high), the proton conductivity of the electrolyte membrane 10' may increase. Accordingly, when proton conductivity of the ion conductive polymer having the same side-chain structure and equivalent weight (EW), tortuosity of the ion movement channel may be further decreased.

Meanwhile, an exemplary method of reducing tortuosity of the ion movement channel in the electrolyte layer according an exemplary embodiment of the present invention may include applying vibration to the electrolyte layer in a direction of arranging ion movement channels. For example, vibration may be applied at a temperature ranging from a first heating temperature, which is about 2° C. greater than the α-transition temperature of the electrolyte layer, to about 200° C. In addition, depending on amplitude of vibration, number of vibration or application time, ion movement channels may be realigned. Commonly, ion movement channels may be realigned by applying vibration from the first surface of the electrolyte layer toward the second surface.

EXAMPLE

Hereinafter, the present invention will be described in more detail with reference to specific examples and test examples. These examples and test examples are provided only for illustration of the present invention and should not be construed as limiting the scope of the present invention.

In Example and Comparative Example of the present invention, the thickness of the electrolyte layer was set to 50.8 μm. In addition, Nafion 212® (DuPont Co., USA) was used as an ion conductive polymer in Example and Comparative Example.

Comparative Example

A non-treated electrolyte layer (Nafion 212®, DuPont Co., USA) was used.

Example

A perfluorinated sulfonic acid electrolyte layer with a long side-chain was used. In addition, in Example, the temperature condition (110° C. which is 5° C. higher than the α-transition temperature of Nafion 212®), which was 5° C. higher than 105° C., α-transition temperature of the target electrolyte layer, was maintained. Water vapor was permeated in a certain spot of the target electrolyte layer in a thickness direction of the electrolyte membrane and the amount of permeated water vapor was 300 g. For example, an inlet of a glass bottle containing 300 g of water (area permeated by vapor: 28.3 cm$^2$) was sealed with the electrolyte layer and the sealed glass bottle was stored in an oven at a constant temperature of 110° C. Saturated water vapor induced a pressure of about 0.15 MPa and the generated pressure caused water vapor to be supplied to the bottom surface of the electrolyte membrane clogging the inlet of the glass bottle, to move along a thickness direction of the electrolyte membrane and to be discharged to the top surface of the electrolyte membrane.

Evaluation and Analysis

Proton conductivity of Example which undergone permeation of water vapor by the method described above and of Comparative Example which did not undergo a specific treatment were measured. In order to measure the proton conductivity of Example and Comparative Example, resistance in the thickness direction of Example (electrolyte membrane) or Comparative Example (electrolyte layer) at a temperature of 80° C. and a relative humidity of 30 to 90% was measured, and area and thickness conditions were applied.

Figure 7:
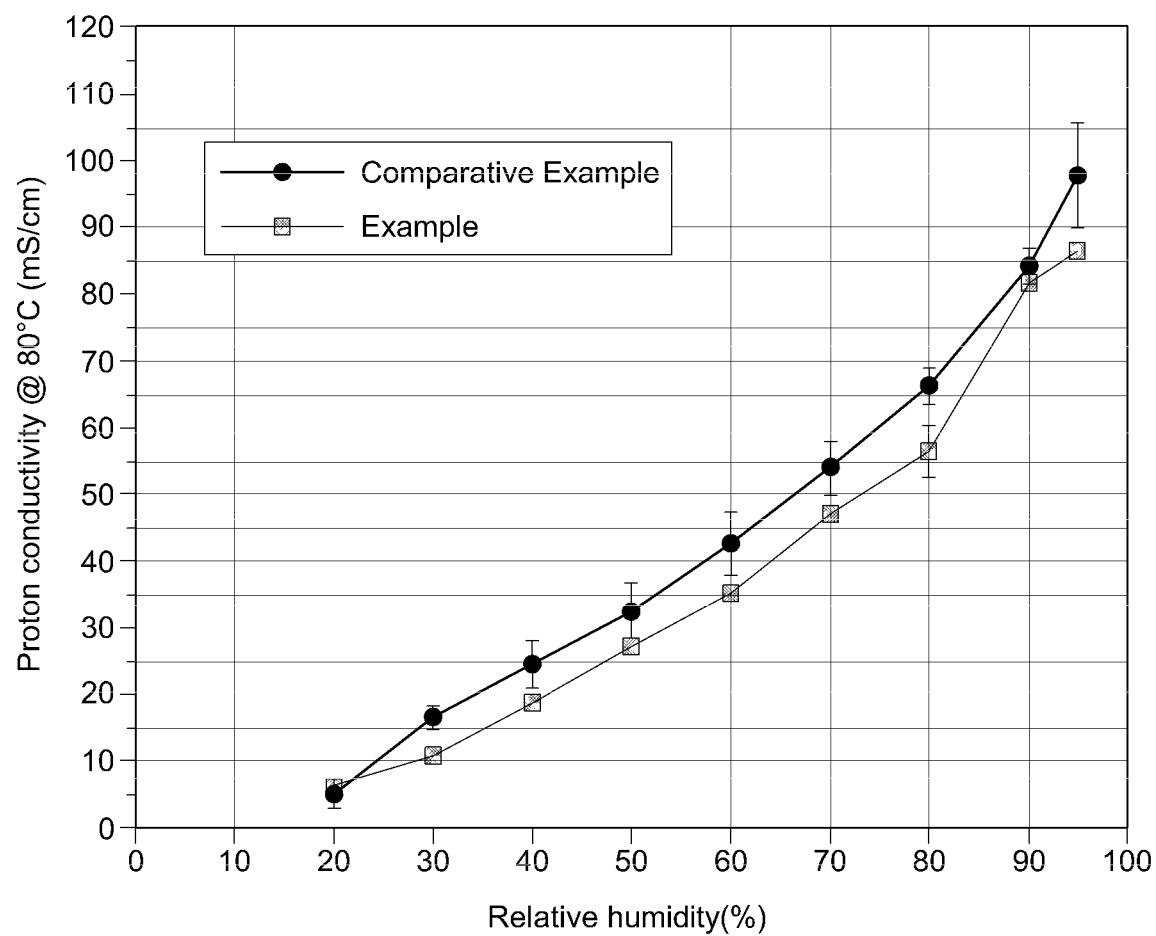
FIG. 7 is a graph showing proton conductivity as a function of relative humidity regarding an exemplary electrolyte membrane manufactured by an exemplary manufacturing method according to an exemplary embodiment of the present invention, compared to Comparative Example.

Meanwhile, proton conductivity before a realignment process of ion movement channels by permeation of water vapor (Comparative Example) and proton conductivity after the realignment process (Example) were measured. Results and increases (%) are shown in the following Table 1. In addition, FIG. 7 is a graph showing proton conductivity as a function of relative humidity regarding Example and Comparative Example.

TABLE 1

| Relative humidity (%) | Proton conductivity (mS/cm) | | Increase (=[Example conductivity − Comparative Example conductivity] * 100/Comparative Example conductivity, %) |
|---|---|---|---|
| | Comparative Example | Example | |
| 30 | 10.7 ± 0.8 | 16.5 ± 1.7 | 53.9 |
| 40 | 18.6 ± 0.2 | 24.4 ± 3.5 | 30.9 |
| 50 | 27.1 ± 1.1 | 32.2 ± 4.4 | 19.0 |
| 60 | 35.0 ± 0.2 | 42.6 ± 4.7 | 21.4 |
| 70 | 47.0 ± 1.4 | 53.9 ± 4.0 | 14.8 |
| 80 | 56.4 ± 3.9 | 66.2 ± 2.7 | 17.4 |
| 90 | 81.7 ± 0.1 | 84.1 ± 2.6 | 2.9 |

The proton conductivity of Example was better than that of Comparative Example under all conditions. In particular, Example exhibited a 53.9% increase in proton conductivity under low humidity conditions (relative humidity 30%) as compared to Comparative Example. Under low relative humidity environments, the realignment effect of the ion movement channel of the electrolyte layer was clearly confirmed.

Vehicles in which hydrogen fuel cells are incorporated continuously require incorporation of high-temperature low-humidity operation conditions in order to improve performance. In this regard, an electrolyte membrane having a realigned ion movement channel according to various exemplary embodiments of the present invention may be suitable for high-temperature low-humidity operation conditions.

As apparent from the foregoing, the method of manufacturing an electrolyte membrane for fuel cells according to various exemplary embodiments of the present invention can provide an electrolyte membrane having realigned ion movement channels of an electrolyte layer by permeating a gas into an electrolyte layer.

In addition, the realignment of ion movement channels in the electrolyte membrane reduces tortuosity of ion movement channels, thereby ultimately facilitating proton movement and improving performance of fuel cells.

The effects of the present invention are not limited to those mentioned above. It should be understood that the effects of the present invention include all effects that can be inferred from the foregoing description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing an electrolyte membrane for fuel cells comprising:
    preparing an electrolyte layer comprising one or more ion conductive polymers, wherein a proton movement channel is formed by the one or more ion conductive polymers; and
    permeating a gas from a first surface of the electrolyte layer to a second surface of the electrolyte layer to reduce tortuosity of the proton movement channel,
    wherein the gas permeates from the first surface to the second surface by making a concentration of the gas at the first surface greater than that at the second surface in the electrolyte layer,
    wherein the first surface and the second surface are opposite surfaces across a thickness direction of the electrolyte layer, and
    wherein the gas is permeated by heating to a temperature ranging from a first heating temperature that is about 2° C. higher than a α-transition temperature (Tα) of the ion conductive polymer to 200° C.

2. The method of claim 1, wherein, each of the one or more ion conductive polymers comprise a main-chain comprising polytetrafluoroethylene (PTFE) and a side-chain comprising sulfonic acid group (—SO$_3$H).

3. The method of claim 1, wherein the electrolyte layer has a thickness of about 5 to 100 μm.

4. The method of claim 1, wherein the electrolyte layer comprises:
    a first layer comprising the one or more ion conductive polymers; and
    a second layer comprising the one or more ion conductive polymers and a support having a three-dimensional network structure,
    wherein the first layer and the second layer are disposed adjacent to each other such that ions are movable between the first layer and the second layer.

5. The method of claim 4, wherein the support comprises one or more of selected from expanded polytetrafluoroethylene (e-PTFE), and porous ultra-high molecular weight polyethylene (UHMWPE).

6. The method of claim 5, wherein the porous ultra-high molecular weight polyethylene has an atomic weight of about 3.5 to 7.5 Mamu.

7. The method of claim 1, wherein the gas comprises one or more selected from the group consisting of water vapor (H$_2$O), ethanol (C$_2$H$_5$OH), and propanol (C$_3$H$_7$OH).

8. The method of claim 1, wherein the gas has a boiling point less than the first heating temperature.

9. The method of claim 1, wherein the gas permeates the electrolyte layer at a saturated vapor pressure of the gas.

10. The method of claim 9, wherein the saturated vapor pressure of the gas is of about 0.01 to 1 MPa.

11. The method of claim 1, wherein the gas permeates in an amount of about 0.1 to 10 mg/cm$^2$·min.

12. The method of claim 1, wherein the gas permeates from the first surface to the second surface by making a pressure at the first surface greater than that at the second surface in the electrolyte layer.

13. An electrolyte membrane manufactured by a method of claim 1.

14. A fuel cell comprising an electrolyte membrane of claim 13.

15. A vehicle comprising a fuel cell of claim 14.

* * * * *